United States Patent
Akatani et al.

(10) Patent No.: US 9,040,623 B2
(45) Date of Patent: May 26, 2015

(54) INK FOR INKJET TEXTILE PRINTING AND AN INKJET TEXTILE PRINTING METHOD USING THE SAME

(71) Applicant: Nippon Kayaku Kabushiki Kaisha, Chiyoda-ku, Tokyo (JP)

(72) Inventors: Yoshiki Akatani, Tokyo (JP); Yuji Suzuki, Tokyo (JP)

(73) Assignee: Nippon Kayaku Kabushiki Kaisha, Tokyo (JP)

(*) Notice: Subject to any disclaimer, the term of this patent is extended or adjusted under 35 U.S.C. 154(b) by 28 days.

(21) Appl. No.: 13/854,377

(22) Filed: Apr. 1, 2013

(65) Prior Publication Data

US 2013/0222465 A1    Aug. 29, 2013

Related U.S. Application Data

(62) Division of application No. 12/224,347, filed as application No. PCT/JP2007/054159 on Mar. 5, 2007.

(30) Foreign Application Priority Data

Mar. 6, 2006  (JP) .................................. 2006-060354

(51) Int. Cl.
| | | |
|---|---|---|
| C09D 11/02 | (2014.01) | |
| B41J 2/01 | (2006.01) | |
| C09D 11/326 | (2014.01) | |
| D06P 3/00 | (2006.01) | |
| C09D 11/328 | (2014.01) | |
| C09D 11/38 | (2014.01) | |
| D06P 1/613 | (2006.01) | |
| D06P 1/651 | (2006.01) | |
| D06P 5/30 | (2006.01) | |
| B32B 27/20 | (2006.01) | |
| D06P 3/54 | (2006.01) | |

(52) U.S. Cl.
CPC .............. *C09D 11/326* (2013.01); *D06P 3/004* (2013.01); *C09D 11/328* (2013.01); *C09D 11/38* (2013.01); *D06P 1/613* (2013.01); *D06P 1/6138* (2013.01); *D06P 1/65118* (2013.01); *D06P 1/65131* (2013.01); *D06P 3/54* (2013.01); *D06P 5/30* (2013.01); *B32B 27/20* (2013.01); *B41J 2/01* (2013.01)

(58) Field of Classification Search
USPC .................................................. 8/552, 182.24
See application file for complete search history.

(56) References Cited

U.S. PATENT DOCUMENTS

| | | | |
|---|---|---|---|
| 3,301,830 A * | 1/1967 | Nelson et al. ............... 525/327.7 |
| 5,281,262 A | 1/1994 | Saito | |
| 5,990,201 A | 11/1999 | Miyazaki et al. | |
| 6,126,280 A * | 10/2000 | Hashimoto et al. ........... 347/101 |
| 6,776,829 B2 | 8/2004 | Miyamoto et al. | |
| 7,507,283 B2 | 3/2009 | Akatani et al. | |
| 2003/0085956 A1 * | 5/2003 | Irizawa et al. ................... 347/61 |
| 2003/0196568 A1 | 10/2003 | Miyamoto et al. | |
| 2004/0196343 A1 | 10/2004 | Maekawa et al. | |
| 2004/0250728 A1 | 12/2004 | Ikoma et al. | |
| 2005/0004259 A1 * | 1/2005 | Freyberg et al. ............... 523/160 |
| 2006/0087540 A1 * | 4/2006 | Morimoto ........................ 347/95 |
| 2006/0173094 A1 | 8/2006 | Ikoma et al. | |
| 2006/0254459 A1 * | 11/2006 | Mori et al. .................. 106/31.43 |
| 2009/0113641 A1 | 5/2009 | Akatani et al. | |

FOREIGN PATENT DOCUMENTS

| | | |
|---|---|---|
| GB | 2379222 A | 3/2003 |
| JP | 2-295787 A | 12/1990 |
| JP | 3-259970 A | 11/1991 |
| JP | 7-3178 A | 1/1995 |
| JP | 7-102202 A | 4/1995 |
| JP | 9-291235 A | 11/1997 |
| JP | 10-183041 A | 7/1998 |
| JP | 2001-262017 A | 9/2001 |
| JP | 2003-246954 A | 9/2003 |
| JP | 2003-328282 A | 11/2003 |
| JP | 2004-292522 A | 10/2004 |
| JP | 2004-292523 A | 10/2004 |

(Continued)

OTHER PUBLICATIONS

International Search Report dated May 22, 2007 in corresponding PCT application No. PCT/JP2007/054159.

(Continued)

*Primary Examiner* — Harold Pyon
*Assistant Examiner* — Katie L Hammer
(74) *Attorney, Agent, or Firm* — Nields, Lemack & Frame, LLC

(57) ABSTRACT

The present invention has an object to provide an ink for inkjet textile printing which has excellent fastnesses and causes less bleeding on a textile and to provide a low cost method for inkjet textile printing by using said ink; and relates to an ink for inkjet textile printing wherein the ink contains at least one kind disperse dye, a dispersing agent, water and at least one kind (referred to as A compound) of the compounds represented by the following formula (1):

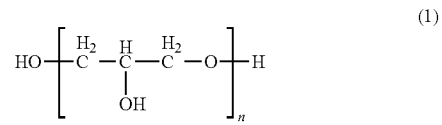

(1)

(wherein, n is an integer number of 1 to 12)
and at least one kind compound (referred to as B' compound) selected from the group consisting of alkanediols having 3 to 5 carbon atoms and polypropylene glycols, as organic solvents, the total content of A compound and B' compound is 12 to 50% by weight based on the total amount of the ink, and the ratio by weight of A compound to B' compound is in the range of 5:1 to 0.7:1.

15 Claims, No Drawings

(56) References Cited

FOREIGN PATENT DOCUMENTS

| | | |
|---|---|---|
| JP | 2005-28559 A | 2/2005 |
| JP | 2005-239946 A | 9/2005 |
| WO | 96/06729 A1 | 3/1996 |
| WO | 01/92431 A1 | 12/2001 |
| WO | 2004/011558 A1 | 2/2004 |

OTHER PUBLICATIONS

International Search Report dated Sep. 13, 2005 in co-pending PCT application No. PCT/JP2005/010422 (now US 7,507,283).

Supp. European Search Report dated Aug. 6, 2008 in co-pending European patent application No. EP 05749008(now US 7,507,283).

Office Action mailed Sep. 2, 2010 in corresponding U.S. Appl. No. 12/244,347.

Final Rejection mailed Feb. 17, 2011 in corresponding U.S. Appl. No. 12/224,347.

Final Rejection mailed Dec. 11, 2012 in corresponding U.S. Appl. No. 12/224,347.

Advisory Action mailed Mar. 12, 2013 in corresponding U.S. Appl. No. 12/224,347.

\* cited by examiner

INK FOR INKJET TEXTILE PRINTING AND AN INKJET TEXTILE PRINTING METHOD USING THE SAME

TECHNICAL FIELD

The present invention relates to an ink for inkjet textile printing with a disperse dye, and an inkjet textile printing method and a dyed product by using said ink.

BACKGROUND ART

Although inkjet textile printing of hydrophobic textile material such as polyester textile by using disperse dyes still has such problems as low speed compared with screen textile printing and so on, it has such advantages that a plate making process is not needed, printed samples can be quickly made, the requirement of small lot processing in a short time for quick delivery is easily met, and it can be interlocked with a CAD system, so it has just started to be widely performed (Non-Patent Literature 1 and Non-Patent Literature 2).

Inkjet textile printing of polyester textile is roughly classified mainly into two methods, the direct printing method where dye ink is applied (printed) to a textile followed by fixing the dye to the textile by heat treatment such as high temperature steaming; and the thermal transfer printing method where dye ink is applied (printed) to an intermediate recording medium (special transfer paper) followed by sublimation transfer of the dye from the intermediate recording medium to the textile by heating.

The direct printing method is used mainly in applications of textile materials for garments, car sheets and the like, and requires four processes as follows:
1. Pretreatment process: Size such as water-soluble polymer is applied to the textile in advance by the padding method or the like in order to prevent ink bleeding in forming a pattern on a textile using an ink jet printer (Patent Literature 1 and Patent Literature 2)
2. Printing process: Dye ink is applied to a textile by an ink jet printer
3. Fixation Process: The dye applied to the textile is fixed in the textile by heat treatment
4. Washing process: Dye, size and the like which are unfixed are removed from the textile On the other hand, the thermal transfer printing is used mainly for printing and finishing of flags and banners, and in the ink is used a dye which has excellent transfer properties into polyester by heat treatment and good sublimation properties. The working process has two processes as follows:
1. Printing process: Dye ink is applied to an intermediate medium by an ink jet printer
2. Transfer Process: The dye is transferred and fixed in a textile from the intermediate medium by heat treatment
and various commercially available transfer papers can be used, so this method does not require pretreatment and washing process is skipped for the application of flags and banners. However, the thermal transfer printing method has such problems that transfer failure and the like easily occur due to wrinkles of transfer paper in the transfer process, sublimation fastness is inferior due to using a dye having good sublimation properties, and light fastness in the full color is inferior due to the limited number of the dyes having both good sublimation properties and high light fastness,
Non-Patent Literature 1: Journal of the Imaging Society of Japan, volume 41, issue 2, page 68 (2002)
Non-Patent Literature 2: Senshoku Keizai Shinbun, issued on Jan. 28, 2004 (some abstract part of Melliand INTERNATIONAL)
Patent Literature 1: JP S61-55277 Page 3
Patent Literature 2: JP 2004-292468

DISCLOSURE OF THE INVENTION

Problems to be Solved by the Invention

The direct printing method for polyester textile by the inkjet method can employ a wide range of dyes compared with the thermal transfer printing method and thus have such a wide application as required for light fastness, sublimation fastness and the like, while it has such problems that pretreatment, washing and the like are needed leading to a cost-up, equipments are needed for pretreatment, fixing, washing and the like, and so on. The present invention has an object to provide a disperse dye ink for inkjet textile printing which has excellent fastnesses and causes less bleeding on textile, as well as a method for low cost inkjet textile printing using said ink.

Means of Solving the Problems

The inventors of the present invention have intensively studied to solve the above problems and found that combination with certain materials at a certain ratio of organic solvents to be added in an ink for the purpose to prevent ink from drying at a nozzle tip and adjust physical properties can achieve a disperse dye ink which has excellent storage stability and causes much less bleeding on polyester textile printed even without pretreatment as well as an inkjet textile printing method using said ink, and completed the present invention. That is, the present invention relates to:
(1) An ink for inkjet textile printing,
wherein
the ink contains at least one kind of disperse dyes, a dispersing agent, water, at least one kind (referred to as A compound) of compounds represented by the following formula (1):

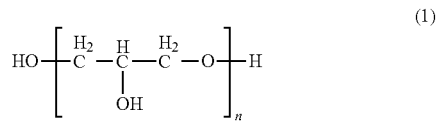

(wherein, n is an integer number of 1 to 12)
and at least one kind (referred to as B compound) selected from the group consisting of alkanediols having 3 to 5 carbon atoms and polypropylene glycol having a molecular weight of 200 or more and 700 or less, as organic solvents; the total content of A compound and B compound is 15 to 45% by weight based on the total amount of the ink; and
the ratio by weight of A compound to B compound is in the range of 4:1 to 1:1,
(2) The ink for inkjet textile printing according to the above (1), containing both of (a) one or more kinds of anionic dispersing agents and (b) at least one kind selected from the group consisting of alkylene oxide adducts of phytosterols and alkylene oxide adducts of cholestanol, as dispersing agents,
(3) The ink for inkjet textile printing according to the above (2), wherein the alkylene oxide adduct is an ethylene oxide adduct, (4) The ink for inkjet textile printing according to the above (2), wherein the anionic dispersing agent is any one kind or both of a formalin condensate of β-naphthalenesulphonate and a formalin condensate of alkylnaphthalenesulphonate,
(5) An inkjet textile printing method using the disperse dye inks of the above (1) to (4),
(6) The inkjet textile printing method according to the above (5), characterized by that the ink is directly applied using an inkjet printer to a hydrophobic textile material without pretreatment to prevent bleeding on textile surfaces in advance, followed by heat treatment at 180° C. to 220° C. in order to fix the dye in the ink into said textile,
(7) A dyed product obtained by the inkjet textile printing method of the above (5) and (6),
(8) An ink for inkjet textile printing
wherein
the ink contains (i) 0.5 to 15% by weight of at least one kind of disperse dyes, (ii) 0.5 to 30% by weight of a dispersing agent, (iii) at least one kind (hereinafter, referred to as A compound) of compounds represented by the following formula (1):

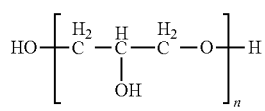

(1)

(wherein, n is an integer number of 1 to 12)
and at least one kind (hereinafter, referred to as B compound) selected from the group consisting of alkanediols having 3 to 5 carbon atoms and polypropylene glycol, as organic solvents;
the total content of A compound and B' compound is 12 to 50% by weight based on the total amount of the ink composition;
(iv) the rest is water; and
the ratio by weight of A compound to B' compound described above is in the range of 5:1 to 0.7:1,
(9) The ink for inkjet textile printing according to the above (8), containing both of (a) one or more kinds of anionic dispersing agents and (b) at least one kind selected from the group consisting of alkylene oxide adducts of phytosterols and alkylene oxide adducts of cholestanol, as dispersing agents,
(10) The ink for inkjet textile printing according to the above (1) or (8), wherein A compound is a polyglycerine of the formula (1) where n is 2 to 12,
(11) The ink for inkjet textile printing according to the above (10), wherein B compound is an alkanediol having 3 to 5 carbon atoms.

Effect of the Invention

The ink for inkjet textile printing of the present invention has characteristics that even when inkjet printing is performed on a polyester textile without pretreatment for inkjet printing, combination at a certain ratio of two certain compounds as organic solvents in the ink to be added for the purpose to prevent ink from drying at a nozzle tip and to adjust physical properties leads to much less bleeding on the textile, as well as the ink has excellent storage stability and excellent discharging property in inkjet printing. Therefore, the ink of the present invention makes it possible to perform inkjet printing on a usual polyester textile without applying pretreatment to prevent bleeding and the like on the polyester textile by the direct printing method.

BEST MODE FOR CARRYING OUT THE INVENTION

As disperse dyes to be used for the ink of the present invention, known disperse dyes can be used, specifically including C.I. Disperse Yellow 42, 49, 76, 83, 88, 93, 99, 114, 119, 126, 160, 163, 165, 180, 183, 186, 198, 199, 200, 224 and 237, C.I. Disperse Orange 29, 30, 31, 38, 42, 44, 45, 53, 54, 55, 71, 73, 80, 86, 96, 118 and 119, C.I. Disperse Red 73, 88, 91, 92, 111, 127, 131, 143, 145, 146, 152, 153, 154, 179, 191, 192, 206, 221, 258, 283, 302, 323, 328 and 359, C.I. Disperse Violet 26, 35, 48, 56, 77 and 97, C.I. Disperse Blue 27, 54, 60, 73, 77, 79, 79:1, 87, 143, 165, 165:1, 165:2, 181, 185, 197, 225, 257, 266, 267, 281, 341, 353, 354, 358, 364, 365, and 368, and the like, and dyes suitable to satisfy required hue and fastnesses in the application can be used.

The above disperse dyes may be in a powder or lump dry state or in a wet cake or slurry state, otherwise may contain a small amount of a dispersing agent such as surfactant for the purpose to suppress dye particle aggregations during and after dye synthesis. These commercially available dyes have grades for industrial dyeing, ink for coloring resin, inkjet and the like, as well as differences in production method, purity, particle size of dye and the like. They preferably have a smaller particle size in order to suppress aggregability after grinding and as small a content of impurities as possible in view of influence on dispersion stability and ink discharge accuracy. In addition, they can be used as a dye for black by formulation of orange and red dyes to a main blue dye. Further, they may contain a small amount of other dyes in the range of adjusting color tone.

The ink of the present invention can be obtained by that the above disperse dyes are homogeneously mixed in water together with a dispersing agent, the above A compound and B compound as organic solvents, and if needed, the other additives necessary for ink preparation, and typically, the above disperse dyes are preferably microparticulated and dispersed in water and prepared as ink together with the above A compound and B compound as organic solvents, and if needed, the other additives necessary for ink preparation. Said microparticulation and dispersion in water is preferably carried out typically in the presence of a dispersing agent. The prepared ink may be, if needed, filtered through a filter of 0.5 to 15 μm, preferably 0.5 to 10 μm, and it is preferred to carry out said filtration for ink for inkjet textile printing. As said dispersing agent, known anionic dispersing agents can be used, and preferable are anionic dispersing agents having a sulfonic acid base. Among them, more preferable are formalin condensates of aromatic sulfonate having a benzene ring or a naphthalene ring including, for example, formalin condensates of lignin sulfonate, formalin condensates of creosote oil sulfonate, formalin condensate of β-naphthalenesulphonate, formalin condensates of alkylnaphthalenesulphonate and/or the like, and the most preferable are formalin condensates of β-naphthalenesulphonate and/or formalin condensates of alkylnaphthalenesulphonate. In addition, in terms of dispersion stability as inkjet ink, it is preferred to use at least one kind of dispersing agents (also, referred to as said oxide adduct dispersing agent) selected from alkylene oxide adducts of phytosterol and/or alkylene oxide adducts of cholestanol in combination with these anionic dispersing agents. The alkylene oxide adduct in said dispersing agents can include, for example, C2 to C5 alkylene oxide adducts, preferably C2 to C3 alkylene oxide adducts and more preferably ethylene oxide adducts.

Therefore, the preferable ink in the present invention contains at least one kind of dispersing agents (also referred to as said oxide adduct dispersing agent) selected from alkylene oxide adducts of phytosterol and/or alkylene oxide adducts of cholestanol, together with an anionic dispersing agent.

As the anionic dispersing agent, a commercially available formalin condensate of lignin sulfonate, formalin condensate of creosote oil sulfonate, formalin condensate of β-naphthalenesulphonate, formalin condensate of alkylnaphthalenesulfonic acid or the like can be used. Specific examples of the above alkylene oxide adducts of phytosterol and/or alkylene oxide adducts of cholestanol include NIKKOL® BPS-20 and NIKKOL® BPS-30 (EC) adducts of phytosterol, manufactured by Nikko Chemicals Co., Ltd.), NIKKOL® BPSH-25 (EC) adduct of hydrogen-added phytosterol, manufactured by Nikko Chemicals Co., Ltd.), NIKKOL® DHC-30 (EO) adduct of cholestanol, manufactured by Nikko Chemicals Co., Ltd.) and the like. With regard to the use ratio of the anionic dispersing agent and said oxide adduct dispersing agent, the said oxide adduct dispersing agent is typically about 0.5 to 20 parts by weight (the same unless specifically noted), preferably 1 to 10 parts, based on 100 parts of the anionic dispersing agent.

The method for microparticulation and dispersion of said dye includes typical methods using a sand mill (bead mill), a roller mill, a ball mill, a paint shaker and an ultrasonic dispersion apparatus, a microfluidizer or the like. Among them, preferable is a sand mill (bead mill) method. In addition, in grinding dye by sand mill (bead mill), the treatment is preferably carried out under such conditions that beads having a small diameter are used and the filling factor of beads is increased for high grinding efficiency. Further, after grinding treatment, coarse particles are preferably removed by filtration and centrifugal separation. Furthermore, when grinding dye, a silicone or acetylene antifoaming agent may be used by addition in a trace amount for the purpose to decrease foaming properties in grinding.

In the above microparticulation and dispersion in water, the dye concentration based on the whole treatment liquid is preferably about 20 to 40% and the dispersing agent concentration is preferably about 6 to 40%, and the rest is water. After dispersion or after-treatment such as filtration, if needed, the dispersion is preferably diluted with a small amount of water to adjust to a desired dye concentration, for example, about 5 to 30%, preferably about 10 to 25%. Typically, the thus obtained dye dispersion liquid is preferably used to prepare the ink. The dye concentration in ink is, including the cases of a low concentration ink and the like, about 0.3 to 25% by weight (hereinafter, the same unless specifically noted), preferably about 0.5 to 20%, and further preferably about 0.5 to 15%, based on the whole ink. In addition, optionally, the lowest concentration is preferably 1% or more. Further, after dispersion, water, a wetting agent, a surface conditioner, an antifoaming agent, an antiseptic agent, a pH adjuster and the like can be added to obtain an ink composition.

The ink of the present invention is characterized by that the ink contains at least one kind (A compound) of polyhydric alcohols represented by the above formula (1) and at least one or more kinds (B' compound) selected from the group consisting of alkanediols having 3 to 5 carbon atoms or polypropylene glycol, preferably at least one kind (B compound) selected from the group consisting of alkanediols having 3 to 5 carbon atoms or polypropylene glycol having a molecular weight of 200 to 700, as organic solvents; the total content of A compound and B' compound, preferably B compound is in the range of 12% or more, preferably 15% or more and further preferably 20% or more, as well as 50% or less, more preferably 45% or less and further optionally 30% or less based on the total ink amount; and the ratio of A compound to B' compound, preferably B compound, is in the range of 5:1 to 0.7:1, preferably in the range of 4:1 to 1:1.

Specific examples of polyhydric alcohol (A compound) represented by the above formula (1) include glycerine, diglycerine (n® 2) and polyglycerine of the formula (1) where n is 3 to 12, more preferably glycerine or polyglycerine of the formula (1) where n is 2 to 11. In this connection, n in the formula (1) indicates the average polymerization degree. Glycerine is the most preferable, and optionally polyglycerine of the formula (1) where n is 4 to 11 is also more preferable. The alkanediols having 3 to 5 carbon atoms as the above B' compound, preferably B compound include propylene glycol, 1,3-butanediol, 1,4-butanediol, 1,5-pentanediol or/and the like. As the above B' compound, any polypropylene glycol can be used as long as the object of the present invention can be achieved, but typically it preferably has a molecular weight of 1,500 or less, more preferably 1,000 or less, and further preferably of the range of 200 to 700.

Preferable combinations of A compound and B compound can include, for example, a combination where A compound is glycerine and B compound is propylene glycol, 1,3-butanediol, 1,4-butanediol, 1,5-pentanediol or polypropylene glycol having a molecular weight of 200 to 700, more preferably propylene glycol. In addition, when A compound is polyglycerine (of the formula (1) where n is 2 to 12), B compound is preferably alkanediols having 3 to 5 carbon atoms, more preferably propylene glycol.

The study by the inventors of the present invention has found that the polyhydric alcohol represented by the formula (1) is excellent in terms of maintaining dispersion stability of the disperse dye while it causes ink to bleed in fixation process for the disperse dye, and that the bleeding is apt to be reduced as n in the formula (1) is larger, and so on. In addition, because it can be predicted that the larger the addition amount of polyhydric alcohol of the formula (1) in the ink is, the more severe this bleeding becomes, the polyhydric alcohol of the formula (1) is preferably selected and used watching viscosity, dispersion stability and anti-bleeding properties of the ink. Further, B compound as a solvent is also good in terms of maintaining dispersion stability of the disperse dye while it is apt to decrease the dispersion stability if its addition amount is larger, and because its moisturizing effect is not as high as polyhydric alcohol of the formula (1), it can be used in combination with polyhydric alcohol of the formula (1) to achieve both dispersion stability and anti-bleeding properties. Further, the ink of the present invention does not need to substantively contain other organic solvents other than the above A compound and B compound as organic solvents, but known organic solvents other than the above A compound and B compound, which have wetting effect, may be added in the range that has no influence on dispersion stability and anti-bleeding properties for the purpose of prevent clogging at a nozzle, and its examples include polyhydric alcohols such as ethylene glycol, diethylene glycol, triethylene glycol, polyethylene glycol and trimethylolpropane, urea, ethylene urea, 2-pyrolidone, N-methyl-2-pyrolidone, saccharides or the like. The content of the organic solvent of the ink in the present invention including the contents of A compound and B compound is 12 to 50% and preferably about 15 to 45% by weight based on the total amount of the ink, and the content of the organic solvents except for the above A compound and B compound is about 0 to 25% and may be substantively zero.

The preferable ink of the present invention obtained as above contains (i) 0.5 to 15% by weight of at least one kind of disperse dyes, (ii) 0.5 to 30% by weight of a dispersing agent, (iii) at least one kind (A compound) of compounds represented by the following formula (1):

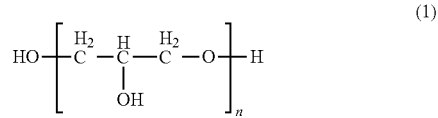

(wherein n is an integer number of 1 to 12)
and at least one kind (B' compound) selected from the group consisting of alkanediols having 3 to 5 carbon atoms and polypropylene glycols, preferably B compound, as organic solvents where the total amount of A compound and B' compound is 12 to 50% by weight based on the whole amount of the ink and (iv) water as the rest; and the ratio by weight of the above A compound to B' compound is in the range of 5:1 to 0.7:1. Said ink is suitable for ink for inkjet textile printing. In particular, said ink more preferably contains, as dispersing agents, both of (a) one or more kinds of anionic dispersing agents and (b) at least one kind selected from the group consisting of alkylene oxide adducts of phytosterols and alkylene oxide adducts of cholestanol.

It is preferred to adjust the physical properties of the ink for inkjet textile printing of the present invention according to a printer to be used, and thus its viscosity at 25° C. is preferably in the range of 2 to 20 mPa·s and its surface tension is preferably in the range of 25 to 45 mN/m. Further specifically, the physical property value is preferably adjusted properly in view of discharge rate, response speed, flight characteristics of ink droplets and the like of a printer to be used. In addition, the ink composition of the present invention may contain a surface conditioner, an antiseptic agent, a fungicide, a pH adjuster and the like, as other additives. The surface conditioner includes polysiloxane-based or polydimethylsiloxane-based surfactants, the antiseptic and fungicide includes sodium dehydroacetate, sodium benzoate, sodium pyridinethion-1-oxide, zinc pyridinethion-1-oxide, amine salts of 1,2-benzisothiazolin-3-one, 1-benzisothiazolin-3-one and the like, the pH adjuster includes alkali hydroxides such as sodium hydroxide, potassium hydroxide and lithium hydroxide, tertiary amines such as triethanolamine, diethanolamine, dimethylethanolamine and diethylethanolamine, and the like, and they can be added according to need. The ink composition of the present invention can be prepared by dispersion and mixing of the above ingredients in a suitable and appropriate manner.

The textile printing method of the present invention can employ known ink jet printers such as continuous, thermal and piezo inkjet printers. In addition, as the hydrophobic textile material for textile printing, any textile can be applied as long as it can be dyed with disperse dyes, specifically including, for example, polyester textile such as polyethylene terephthalate, cation dyeable polyester textile, acetate textile, diacetate textile, triacetate textile, polylactic acid textile and the like. Further, the use of the ink composition of the present invention also makes it possible to print these hydrophobic materials without pretreatment to provide an ink receiving layer. The thermal fixation method in textile printing of the present invention includes wet fixation method by a steamer such as normal pressure steamer, high temperature steamer or high pressure steamer, or dry fixation method by a heat setter or a heater. In order to simplify the process, an ink jet printer equipped with a fixation apparatus such as heater can be used.

The present invention will be explained further specifically based on Examples, Production Examples and Comparative Examples, but the present invention is not limited to these Examples. In this connection, "parts" means "parts by weight" and the concentrations are indicated as "% by weight" in Examples unless specifically noted.

Production Example 1

The following ingredients formulated with the following composition underwent dispersion treatment with a sand mill using glass beads having a diameter of 0.3 mm under water cooling for 15 hours and after completion of the dispersion treatment, 100 parts of ion-exchanged water was added to prepare an aqueous dispersion liquid having a dye concentration of 15%. Next, said dispersion was filtered through a glass fiber filter GC-50 (manufactured by Toyo Roshi Kaisha, Ltd,) to remove coarse particles so as to obtain an aqueous dispersion. The dye concentration of the aqueous dispersion was 15%. The average particle size was 99 nm and the viscosity was 3.5 mPa·s.

In this connection, the viscosity was measured using an R-115 viscometer (E-type) manufactured by Toki Sangyo Co., Ltd., and for the average particle size, the aqueous dispersion liquid was diluted with ion-exchanged water until its dye concentration became 0.5% mass and the volume average median diameter was measured using a measuring apparatus for particle size distribution, Dynamic Light Scattering Nano-particle Size Analyzer LB-500 (manufactured by HORIBA Ltd.).

TABLE 1

| | |
|---|---|
| C.I. Disperse Red 92 (Note 1) | 30.0 parts |
| Lavelin$^{RTM}$ AN-40 (Note 2) | 45.0 parts |
| NIKKOL$^{RTM}$ BPS-30 (Note 3) | 1.8 parts |
| Surfynol$^{RTM}$ 104PG50 (Note 4) | 0.2 parts |
| Ion-exchanged water | 23.0 parts |

(Note 1): Manufactured by Nippon Kayaku Co., Ltd.
(Note 2): A 40% aqueous solution of formalin condensate of methylnaphthalenesulphonate, manufactured by Dai-ichi Kogyo Seiyaku Co., Ltd.
(Note 3): An EO (30) adduct of phytosterol, manufactured by Nikko Chemicals Co., Ltd.
(Note 4): An acetylene glycol-based antifoaming agent, manufactured by Air Products and Chemicals, Inc.

Production Example 2

In the same manner as in Production Example 1, the following ingredients formulated with the following rate underwent dispersion treatment, dilution with ion-exchanged water, and filtration to obtain an aqueous dispersion. The dye concentration of this aqueous dispersion was 15%. The average particle size was 92 nm and the viscosity was 402 mPa·s.

TABLE 2

| | |
|---|---|
| C.I. Disperse Red 92 | 30.0 parts |
| DEMOL$^{RTM}$ N (Note 5) | 27.0 parts |
| NIKKOL$^{RTM}$ BPS-30 | 1.8 parts |
| Surfynol$^{RTM}$ 104P G50 | 0.2 parts |
| Ion-exchanged water | 41.0 parts |

(Note 5): A formalin condensate of β-naphthalenesulphonate, manufactured by Kao Corporation.

Production Example 3

In the same manner as in Production Example 1, the following ingredients formulated with the following rate underwent dispersion treatment, dilution with ion-exchanged water, and filtration to obtain an aqueous dispersion. The dye concentration of this aqueous dispersion was 15%. The average particle size was 95 nm and the viscosity was 3.6 mPa·s.

TABLE 3

| | |
|---|---|
| C.I. Disperse Red 92 | 30.0 parts |
| Lavelin$^{RTM}$ AN-40 | 45.0 parts |
| NIKKOL$^{RTM}$ DHC-30 (Note 6) | 1.8 parts |
| Surfynol$^{RTM}$ 104PG50 | 0.2 parts |
| Ion-exchanged water | 23.0 parts |

(Note 6): An EO (30) adduct of cholestanol, manufactured by Nikko Chemicals Co., Ltd.

Production Example 4

In the same manner as in Production Example 1, the following ingredients formulated with the following rate underwent dispersion treatment, dilution with ion-exchanged water, and filtration to obtain an aqueous dispersion. The dye concentration of this aqueous dispersion was 15%. The average particle size was 97 nm and the viscosity was 3.4 mPa·s.

TABLE 4

| | |
|---|---|
| Kayaset Yellow$^{RTM}$ A-H (Note 7) | 30.0 parts |
| Lavelin$^{RTM}$ AN-40 | 45.0 parts |
| NIKKOL$^{RTM}$ BPS-30 | 1.8 parts |
| Surfynol$^{RTM}$ 104PG50 | 0.2 parts |
| Ion-exchanged water | 23.0 parts |

(Note 7): C.I. Disperse Yellow 160, manufactured by Nippon Kayaku Co., Ltd.

Production Example 5

In the same manner as in Production Example 1, the following ingredients formulated with the following rate underwent dispersion treatment, dilution with ion-exchanged water, and filtration to obtain an aqueous dispersion. The dye concentration of this aqueous dispersion was 15%. The average particle size was 40 nm and the viscosity was 3.7 mPa·s.

TABLE 5

| | |
|---|---|
| C.I. Disperse Blue 60 (Note 8) | 30.0 parts |
| Lavelin$^{RTM}$ AN-40 | 45.0 parts |
| NIKKOL$^{RTM}$ BPS-30 | 1.8 parts |
| Surfynol$^{RTM}$ 104PG50 | 0.2 parts |
| Ion-exchanged water | 23.0 parts |

(Note 8): Manufactured by Nippon Kayaku Co., Ltd.

Example 1

The ingredients of the following formulation were mixed to prepare an ink of the present invention, which was filtered under pressure through a 0.8 μm filter (DISMIC® 25CS080AN) to obtain an ink for inkjet textile printing. The obtained ink had a viscosity of 3.8 mPa·s, an average dye particle size of 92 nm and a surface tension of 33 mN/m. Using the obtained ink, printing was performed on a commercial polyester cloth (pongee) by a commercial printer (trade name: PX-V500, manufactured by Seiko-Epson Corporation), and the discharging property and the bleeding on the textile (immediately after printing) were evaluated. In addition, heat treatment at 190° C. for 45 seconds was carried out on the printed products and the printed image was dyed on a polyester cloth (pongee), and then the bleeding on the textile (immediately after printing and after heat treatment) was evaluated. The printed image after heat treatment had a vivid magenta color. The fastness of said dyed polyester cloth (pongee) was on a very superior level showing light fastness (JIS L-0842, Carbon)® class 7.

In this connection, the viscosity and the average particle size were measured by the same method as in Production Example 1 and the surface tension was measured using a surface tension meter (Plate method) CBVP-Z manufactured by Kyowa Interface Science Corp., Ltd.

TABLE 6

| | |
|---|---|
| Dispersion liquid of Production Example 1 | 43.33 parts |
| Ion-exchanged water | 34.14 parts |
| Polyglycerine #750 (Note 9) | 15.00 parts |
| Propylene glycol | 7.50 parts |
| BYK-348 (Note 10) | 0.03 parts |

(Note 9): Trade name; a polyhydric alcohol (n = 10) of the formula (1), manufactured by Sakamoto Yakuhin Kogyo Co., Ltd.
(Note 10): Trade name; a surface conditioner, manufactured by BYK Japan KK.

Example 2

The ingredients of the following formulation were mixed in the same manner as in Example 1 to prepare an ink for inkjet textile printing. The obtained ink had a viscosity of 3.7 mPa·s, a dye average particle size of 95 nm and a surface tension of 34 m N/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 7

| | |
|---|---|
| Dispersion of Production Example 1 | 43.33 parts |
| Ion-exchanged water | 32.64 parts |
| Polyglycerine #310 (Note 11) | 16.00 parts |
| Propylene glycol | 8.00 parts |
| BYK-348 | 0.03 parts |

(Note 11): Trade name; a polyhydric alcohol (n = 4) of the formula (1) manufactured by Sakamoto Yakuhin Kogyo Co., Ltd.

Example 3

The ingredients of the following formulation were mixed in the same manner as in Example 1 to prepare an ink for inkjet textile printing. The obtained ink had a viscosity of 3.6 mPa·s, a dye average particle size of 91 nm and a surface tension of 34 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 8

| | |
|---|---|
| Dispersion of Production Example 1 | 43.33 parts |
| Ion-exchanged water | 29.64 parts |
| Glycerine | 18.00 parts |
| Propylene glycol | 9.00 parts |
| BYK-348 | 0.03 parts |

Example 4

The ingredients of the following formulation were mixed in the same manner as in Example 1 to prepare an ink for inkjet textile printing. The obtained ink had a viscosity of 3.5 mPa·s, a dye average particle size of 92 nm and a surface tension of 34 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 9

| | |
|---|---|
| Dispersion of Production Example 1 | 43.33 parts |
| Ion-exchanged water | 29.64 parts |
| Glycerine | 20.00 parts |
| Propylene glycol | 5.00 parts |
| BYK-348 | 0.03 parts |

Example 5

The ingredients of the following formulation were mixed in the same manner as in Example 1 to prepare an ink for inkjet textile printing. The obtained ink had a viscosity of 3.7 mPa·s, a dye average particle size of 95 nm and a surface tension of 34 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 10

| | |
|---|---|
| Dispersion of Production Example 1 | 43.33 parts |
| Ion-exchanged water | 28.64 parts |
| Glycerine | 14.00 parts |
| Propylene glycol | 14.00 parts |
| BYK-348 | 0.03 parts |

Example 6

The ingredients of the following formulation were mixed in the same manner as in Example 1 to prepare an ink for inkjet textile printing. The obtained ink had a viscosity of 4.1 mPa·s, a dye average particle size of 89 nm and a surface tension of 33 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 11

| | |
|---|---|
| Dispersion of Production Example 1 | 8.67 parts |
| Ion-exchanged water | 46.30 parts |
| Glycerine | 30.00 parts |
| 1,4-Butanediol | 15.00 parts |
| BYK-348 | 0.03 parts |

Example 7

The ingredients of the following formulation were mixed in the same manner as in Example 1 to prepare an ink for inkjet textile printing. The obtained ink had a viscosity of 3.4 mPa·s, a dye average particle size of 95 nm and a surface tension of 34 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid light magenta color.

TABLE 12

| | |
|---|---|
| Dispersion of Production Example 1 | 43.33 parts |
| Ion-exchanged water | 32.64 parts |
| Glycerine | 16.00 parts |
| Polypropylene glycol 700 (Note 12) | 8.00 parts |
| BYK-348 | 0.03 parts |

(Note 12): A polypropylene glycol having an average molecular weight of about 700.

Example 8

The ingredients of the following formulation were mixed in the same manner as in Example 1 to prepare an ink for inkjet textile printing. The obtained ink had a viscosity of 3.3 mPa·s, a dye average particle size of 94 nm and a surface tension of 33 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 13

| | |
|---|---|
| Dispersion of Production Example 1 | 43.33 parts |
| Ion-exchanged water | 32.64 parts |
| Glycerine | 16.00 parts |
| Polypropylene glycol 400 (Note 13) | 8.00 parts |
| BYK-348 | 0.03 parts |

(Note 13): A polypropylene glycol having an average molecular weight of about 400.

Example 9

The ingredients of the following formulation were mixed in the same manner as in Example 1 to prepare an ink for inkjet textile printing. The obtained ink had a viscosity of 3.3 mPa's, a dye average particle size of 94 nm and a surface tension of 34 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 14

| | |
|---|---|
| Dispersion of Production Example 1 | 43.33 parts |
| Ion-exchanged water | 32.64 parts |
| Glycerine | 16.00 parts |
| Polypropylene glycol 200 (Note 14) | 8.00 parts |
| BYK-348 | 0.03 parts |

(Note 14): A polypropylene glycol having an average molecular weight of about 200.

Example 10

The ingredients of the following formulation were mixed in the same manner as in Example 1 to prepare an ink for inkjet textile printing. The obtained ink had a viscosity of 2.8 mPa·s, a dye average particle size of 88 nm and a surface tension of 33 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 15

| | |
|---|---|
| Dispersion of Production Example 1 | 43.33 parts |
| Ion-exchanged water | 41.64 parts |
| Glycerine | 10.00 parts |
| 1,5-Pentanediol | 5.00 parts |
| BYK-348 | 0.03 parts |

Example 11

The ingredients of the following formulation were mixed in the same manner as in Example 1 to prepare an ink for inkjet textile printing. The obtained ink had a viscosity of 3.9 mPa·s, a dye average particle size of 90 nm and a surface tension of 34 mN/m. Using the obtained ink, printing and heat treatment were carried out in the same manner as in Example 1, and the discharging property and the bleeding on the textile (immediately after printing and after heat treatment) were evaluated, The printed image after heat treatment was dyed on the polyester cloth (pongee), exhibiting a vivid magenta color.

TABLE 16

| | |
|---|---|
| Dispersion of Production Example 2 | 43.33 parts |
| Ion-exchanged water | 34.14 parts |
| Glycerine | 15.00 parts |
| Propylene glycol | 7.50 parts |
| BYK-348 | 0.03 parts |

Example 12

The ingredients of the following formulation were mixed in the same manner as in Example 1 to prepare an ink for inkjet textile printing. The obtained ink had a viscosity of 4.0 mPa·s, a dye average particle size of 94 nm and a surface tension of 34 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color,

TABLE 17

| | |
|---|---|
| Dispersion of Production Example 3 | 43.33 parts |
| Ion-exchanged water | 34.14 parts |
| Glycerine | 15.00 parts |
| Propylene glycol | 7.50 parts |
| BYK-348 | 0.03 parts |

Example 13

The ingredients of the following formulation were mixed in the same manner as in Example 1 to prepare an ink for inkjet textile printing. The obtained ink had a viscosity of 4.0 mPa·s, a dye average particle size of 105 nm and a surface tension of 34 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid yellow color.

The fastness of the dyed polyester cloth (pongee) had a very superior level showing light fastness (JIS L-0842, Carbon)=class 6 to 7.

TABLE 18

| | |
|---|---|
| Dispersion of Production Example 4 | 18.58 parts |
| Ion-exchanged water | 51.39 parts |
| Polyglycerine #750 | 20.00 parts |
| Propylene glycol | 10.00 parts |
| BYK-348 | 0.03 parts |

Example 14

The ingredients of the following formulation were mixed in the same manner as in Example 1 to prepare an ink for inkjet textile printing. The obtained ink had a viscosity of 3.9 mPa·s, a dye average particle size of 52 nm and a surface tension of 34 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid cyan color.

The fastness of the dyed polyester cloth (pongee) had a sufficiently practicable level for application of sign and displays, showing light fastness (JIS L-0842, Carbon)=class 7.

TABLE 19

| | |
|---|---|
| Dispersion of Production Example 5 | 43.33 parts |
| Ion-exchanged water | 34.14 parts |
| Polyglycerine #750 | 15.00 parts |
| Propylene glycol | 7.50 parts |
| BYK-348 | 0.03 parts |

Comparative Example 1

The ingredients of the following formulation were mixed in the same manner as in Example 1 to prepare an ink for inkjet textile printing. The obtained ink had a viscosity of 1.8 mPa·s, a dye average particle size of 94 nm and a surface tension of 32 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 20

| | |
|---|---|
| Dispersion of Production Example 1 | 43.33 parts |
| Ion-exchanged water | 47.64 parts |

TABLE 20-continued

| Glycerine | 6.00 parts |
|---|---|
| Propylene glycol | 3.00 parts |
| BYK-348 | 0.03 parts |

Comparative Example 2

The ingredients of the following formulation were mixed in the same manner as in Example 1 to prepare an ink. The obtained ink had a viscosity of 5.2 mPa·s, a dye average particle size of 85 nm and a surface tension of 33 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid light magenta color.

TABLE 21

| Dispersion of Production Example 1 | 8.67 parts |
|---|---|
| Ion-exchanged water | 31.30 parts |
| Glycerine | 40.00 parts |
| Propylene glycol | 20.00 parts |
| BYK-348 | 0.03 parts |

Comparative Example 3

The ingredients of the following formulation were mixed in the same manner as in Example 1 to prepare an ink for inkjet textile printing. The obtained ink had a viscosity of 3.0 mPa·s, a dye average particle size of 88 nm and a surface tension of 34 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 22

| Dispersion of Production Example 1 | 43.33 parts |
|---|---|
| Ion-exchanged water | 32.64 parts |
| Glycerine | 24.00 parts |
| BYK-348 | 0.03 parts |

Comparative Example 4

The ingredients of the following formulation were mixed in the same manner as in Example 1 to prepare an ink for inkjet textile printing. The obtained ink had a viscosity of 3.7 mPa·s, a dye average particle size of 89 nm and a surface tension of 34 mN/m. Using the obtained ink, printing and heat treatment were carried out in the same manner as in Example 1, and the discharging property and the bleeding on the textile (immediately after printing and after heat treatment) were evaluated. The printed image after heat treatment was dyed on the polyester cloth (pongee), exhibiting a vivid magenta color.

TABLE 23

| Dispersion of Production Example 1 | 43.33 parts |
|---|---|
| Ion-exchanged water | 29.64 parts |
| Glycerine | 9.00 parts |
| Propylene glycol | 18.00 parts |
| BYK-348 | 0.03 parts |

In Table 24 were shown the evaluation results on dispersion stability, discharging property, bleeding on the textile immediately after printing and bleeding on the textile after heat treatment, of the inks for inkjet textile printing in Example 1 to Example 14 and Comparative Example 1 to Comparative Example 4, The above method for the evaluation of dispersion stability and the above criteria for evaluation of sedimentation were employed. The criteria for evaluation of discharging property are shown below.

○ Solid printing was performed continuously on ten pieces of A4 media and succeeded until the end.

Δ The above same printing resulted in slight line artifacts.

x The above same printing resulted in severe discharge failure.

The criteria for evaluation of bleeding on the textile (immediately after printing and after heat treatment) are shown below.

○ There was almost no bleeding nor crushing of characters, outline characters and thin line patterns, and thus good printing could be performed, Δ Slight bleeding and/or crushing of characters could be observed.

x marked bleeding and/or crushing could be observed.

TABLE 24

| | Particle size (nm) | Viscosity (mPa·s) | Surface tension (mN/m) | #1 | #2 (nm) | #3 (mPa·s) | #4 (mN/m) | #5 | #6 | #7 |
|---|---|---|---|---|---|---|---|---|---|---|
| Example 1 | 92 | 3.8 | 33 | ○ | 95 | 3.8 | 33 | ○ | ○ | ○ |
| Example 2 | 95 | 3.7 | 34 | ○ | 100 | 3.7 | 34 | ○ | ○ | ○ |
| Example 3 | 91 | 3.6 | 34 | ○ | 92 | 3.7 | 33 | ○ | ○ | ○ |
| Example 4 | 92 | 3.5 | 34 | ○ | 97 | 3.5 | 34 | ○ | ○ | ○ |
| Example 5 | 95 | 3.7 | 34 | ○ | 93 | 3.5 | 36 | ○ | ○ | ○ |
| Example 6 | 89 | 4.1 | 33 | ○ | 95 | 4.1 | 33 | ○ | ○ | ○ |
| Example 7 | 95 | 3.4 | 34 | ○ | 100 | 3.5 | 35 | ○ | ○ | ○ |
| Example 8 | 94 | 3.3 | 33 | ○ | 96 | 3.3 | 33 | ○ | ○ | ○ |
| Example 9 | 94 | 3.3 | 34 | ○ | 99 | 3.4 | 35 | ○ | ○ | ○ |
| Example 10 | 88 | 2.8 | 33 | ○ | 92 | 2.8 | 33 | ○ | ○ | ○ |
| Example 11 | 90 | 3.9 | 34 | ○ | 94 | 3.7 | 35 | ○ | ○ | ○ |
| Example 12 | 94 | 4 | 34 | ○ | 99 | 4 | 34 | ○ | ○ | ○ |
| Exampls 13 | 105 | 4 | 34 | ○ | 103 | 3.9 | 36 | ○ | ○ | ○ |

TABLE 24-continued

|  | Particle size (nm) | Viscosity (mPa·s) | Surface tension (mN/m) | #1 | #2 (nm) | #3 (mPa·s) | #4 (mN/m) | #5 | #6 | #7 |
|---|---|---|---|---|---|---|---|---|---|---|
| Example 14 | 52 | 3.9 | 34 | ○ | 56 | 3.9 | 37 | ○ | ○ | ○ |
| Comp. Ex. 1 | 94 | 1.8 | 32 | ○ | 96 | 1.7 | 32 | X | X | X |
| Comp. Ex. 2 | 85 | 5.2 | 33 | ○ | 85 | 5.4 | 35 | Δ | Δ | X |
| Comp. Ex. 3 | 88 | 3 | 34 | ○ | 89 | 3 | 35 | Δ | Δ | X |
| Comp. Ex. 4 | 89 | 3.7 | 34 | Δ | 126 | 4.5 | 35 | ○ | ○ | ○ |

"Comp. Ex." stands for Comparative Example.
1: Sedimentation after 1 week at 60° C.
2: Particle size after 1 week at 60° C.
3: Viscosity after 1 week at 60° C.
4: Surface tension after 1 week at 60° C.
5: Discharging property
6: Bleeding on fiber (immediately after printing)
7: Bleeding on fiber (after heat treatment)

As is clear from Table 24, any of the inks for inkjet textile printing of the present invention in the above Examples 1 to 14 is excellent in dispersion stability, discharging property and anti-bleeding property on a textile (immediately after printing and after heat treatment).

For Comparative Examples 1 and 2, the total contents of A compound and B compound as the organic solvents in the ink are respectively 9% by weight and 60% by weight, which are out of the range of said organic solvent content of the present invention, and thus it can be confirmed that the inks of Comparative Examples 1 and 2 have a problem with any of discharging property and anti-bleeding property on a textile (immediately after printing and after heat treatment) compared with Example 3.

For Comparative Example 3, the ratio by weight of A compound to B compound as the organic solvents is 10:0, which shows that B compound is not contained and A compound is contained alone, and thus it can be confirmed that the ink of Comparative Example 3 has a problem with discharging property and anti-bleeding property on a textile (immediately after printing and after heat treatment) compared with Example 9.

For Comparative Example 4, the ratio by weight of A compound to B compound as the organic solvents is 1:2 which is out of the range of the ratio of the both compounds in the present invention, and it can be confirmed that the ink of Comparative Example 4 has a problem due to sedimentation of the coloring material observed after storage at 60° C. for one week and changes in particle size and viscosity after storage, compared with Example 3.

The invention claimed is:

1. An inkjet textile printing method comprising jetting an ink on a textile wherein the ink contains at least one kind of disperse dyes, a dispersing agent,

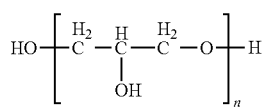
(1)

water, at least one kind (referred to as A compound) of compounds represented by the following formula (1):
(wherein, n is an integer number of 1 to 12)
and at least one kind (referred to as B compound) selected from the group consisting of alkanediols having 3 to 5 carbon atoms and polypropylene glycol having a molecular weight of 200 or more and 700 or less, as organic solvents;

the total content of A compound and B compound is 15 to 45% by weight based on the total amount of the ink; and
the ratio by weight of A compound to B compound is in the range of 4:1 to 1:1.

2. The inkjet textile printing method according to claim 1, containing both of (a) one or more kinds of anionic dispersing agents and (b) at least one kind selected from the group consisting of alkylene oxide adducts of phytosterols and alkylene oxide adducts of cholestanol, as dispersing agents.

3. The inkjet textile printing method according to claim 2, wherein the alkylene oxide adduct is an ethylene oxide adduct.

4. The inkjet textile printing method according to claim 2, wherein the anionic dispersing agent is any one kind or both of a formalin condensate of β-naphthalenesulphonate and a formalin condensate of alkylnaphthalenesulphonate.

5. The inkjet textile printing method according to claim 1, wherein the ink is directly applied using an inkjet printer to a hydrophobic textile material without pretreatment to prevent bleeding on textile surfaces in advance, followed by heat treatment at 180° C. to 220° C. in order to fix the dye in the ink into said textile.

6. A dyed product obtained by the inkjet textile printing method according to claim 1.

7. A dyed product obtained by the inkjet textile printing method according to claim 2.

8. A dyed product obtained by the inkjet textile printing method according to claim 3.

9. A dyed product obtained by the inkjet textile printing method according to claim 4.

10. A dyed product obtained by the inkjet textile printing method according to claim 5.

11. An inkjet textile printing method comprising jetting an ink on a textile wherein the ink contains (i) 0.5 to 15% by weight of at least one kind of disperse dyes, (ii) 0.5 to 30% by weight of a dispersing agent, (iii) at least one kind (referred to as A compound) of compounds represented by the following formula (1):

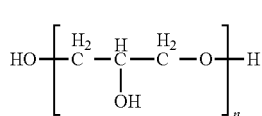
(1)

(wherein, n is an integer number of 1 to 12)
and at least one kind (hereinafter, referred to as B' compound) selected from the group consisting of alkanediols having 3 to 5 carbon atoms and polypropylene glycol, as organic solvents;

the total content of A compound and B' compound is 12 to 50% by weight based on the total amount of the ink;
(iv) the rest is water; and
the ratio by weight of A compound to B' compound described above is in the range of 5:1 to 0.7:1.

12. The inkjet textile printing method according to claim 11, wherein the ink contains both of (a) one or more kinds of anionic dispersing agents and (b) at least one kind selected from the group consisting of alkylene oxide adducts of phytosterols and alkylene oxide adducts of cholestanol, as dispersing agents, 13. The inkjet textile printing method according to claim 1, wherein A compound is a polyglycerine of the formula (1) where n is 2 to 12.

14. The inkjet textile printing method according to claim 11, wherein A compound is a polyglycerine of the formula (1) where n is 2 to 12.

15. The inkjet textile printing method according to claim 1, wherein B compound is an alkanediol having 3 to 5 carbon atoms.

* * * * *